United States Patent
Nakayama et al.

(10) Patent No.: US 10,637,032 B2
(45) Date of Patent: Apr. 28, 2020

(54) CONNECTION STRUCTURE BETWEEN BATTERY MODULE AND ELECTRICAL DEVICE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Osamu Nakayama, Yokkaichi (JP); Naoki Fukushima, Yokkaichi (JP); Katsushi Miyazaki, Yokkaichi (JP); Seishi Kimura, Yokkaichi (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-Shi (JP)

( * ) Notice: Subject to any disclaimer, the term of this patent is extended or adjusted under 35 U.S.C. 154(b) by 124 days.

(21) Appl. No.: 15/770,222

(22) PCT Filed: Oct. 12, 2016

(86) PCT No.: PCT/JP2016/080213
§ 371 (c)(1),
(2) Date: Apr. 23, 2018

(87) PCT Pub. No.: WO2017/073319
PCT Pub. Date: May 4, 2017

(65) Prior Publication Data
US 2018/0315975 A1 Nov. 1, 2018

(30) Foreign Application Priority Data
Oct. 28, 2015 (JP) .................................. 2015-211498

(51) Int. Cl.
*H01M 2/20* (2006.01)
*H01M 2/10* (2006.01)
(Continued)

(52) U.S. Cl.
CPC ......... *H01M 2/206* (2013.01); *H01M 2/1077* (2013.01); *H01M 2/26* (2013.01); *H01R 4/029* (2013.01); *H01M 2220/20* (2013.01)

(58) Field of Classification Search
None
See application file for complete search history.

(56) References Cited

U.S. PATENT DOCUMENTS

| 4,420,545 A | * | 12/1983 | Meyer | H01M 2/0255 429/101 |
| 2009/0123830 A1 | * | 5/2009 | Kato | H01M 2/202 429/160 |

(Continued)

FOREIGN PATENT DOCUMENTS

| JP | S61197650 A | 9/1986 |
| JP | 2015088267 A | 5/2015 |

OTHER PUBLICATIONS

International Search Report for Application No. PCT/JP2016/080213 dated Dec. 20, 2016; 6 pages.

*Primary Examiner* — Jeremiah R Smith
(74) *Attorney, Agent, or Firm* — Reising Ethington, P.C.

(57) ABSTRACT

A connection structure between a battery module and an electrical device, the connection structure for connecting a battery module in which a plurality of electric cells are arranged in a line to an electrical device arranged on a side of the battery module. The connection structure includes: a connecting portion provided in the electrical device; a connection electrode provided in the battery module; and a connection bus bar having one end and another end, the one end being connected to the connecting portion of the elec- (Continued)

trical device, and a welding plate to be welded to the connection electrode in the battery module being provided at the other end. The welding plate is provided with a deformation-allowing portion for keeping the welding plate and the connection electrode of the battery module in a state of contact, the deformation-allowing portion being able to elastically deform.

5 Claims, 12 Drawing Sheets

(51) Int. Cl.
    *H01M 2/26*     (2006.01)
    *H01R 4/02*     (2006.01)

(56) References Cited

U.S. PATENT DOCUMENTS

| | | | |
|---|---|---|---|
| 2011/0151305 A1* | 6/2011 | Bolze | H01M 2/1072 |
| | | | 429/120 |
| 2011/0248719 A1* | 10/2011 | Aoki | H01M 10/482 |
| | | | 324/426 |
| 2016/0254515 A1* | 9/2016 | Shimoda | H01M 2/206 |
| | | | 429/61 |
| 2016/0294023 A1* | 10/2016 | Aoki | H01M 2/30 |
| 2016/0336573 A1* | 11/2016 | Osanai | H01M 10/425 |
| 2016/0344012 A1 | 11/2016 | Fukushima et al. | |
| 2017/0005313 A1* | 1/2017 | Ogawa | H01M 2/1016 |
| 2017/0062783 A1* | 3/2017 | Kim | H01M 2/1077 |
| 2017/0141366 A1* | 5/2017 | Inakawa | B60K 1/04 |

* cited by examiner

CONNECTION STRUCTURE BETWEEN BATTERY MODULE AND ELECTRICAL DEVICE

CROSS REFERENCE TO RELATED APPLICATIONS

This application claims the priority of Japanese patent application JP2015-211498 filed on Oct. 28, 2015, the entire contents of which are incorporated herein.

TECHNICAL FIELD

The technique disclosed in this specification relates to a structure for electrically connecting a battery module and another electrical device to each other.

BACKGROUND ART

A technique is known by which, when a battery module with a plurality of electric cells arranged and connected to each other is electrically connected to another electrical device that is arranged on a side of the battery module, a connection bus bar is arranged to span an electrode at an end portion of the battery module and a connecting portion of the electrical device (e.g. Patent Document 1 JP2004-95381A). In a specific example, in view of different height positions of the electrode of the battery module and the connecting portion of the electrical device (e.g. the connecting portion of the electrical device is located at a higher position than the electrode of the battery module), a means has been proposed in which an L-shaped welding plate with a flat welding face is later attached to a leading end of the connection bus bar by means of ultrasonic welding or the like, and a base end of the connection bus bar is fastened and fixed to the connecting portion of the electrical device using a fastening member, and meanwhile, the welding face of the welding plate is placed on the electrode of the battery module and is fixed by means of laser welding.

SUMMARY

In the case of the aforementioned means, when the welding face of the welding plate is laser-welded to the electrode of the battery module, usually, the welding face is held using a jig. However, due to the welding plate being attached later, there is concern that a position shift will occur, e.g. the distance between the welding plate and the opposing counterpart electrode will vary, or the welding face will be inclined. Then, even if the welding face is held by a jig, there may be a case where the welding plate cannot be properly brought into close contact with the counterpart electrode, and thus welding failure is a concern.

Note that a position shift between the welding face of the welding plate and the counterpart electrode may also occur similarly due to, for example, size tolerance of the welding plate or the like, or arrangement tolerance between the battery module and the electrical device.

The technique disclosed in this specification was finished based on the foregoing situation, and aims to enable a welding plate provided on a connection bus bar to be firmly welded to a connection electrode of a counterpart battery module.

A connection structure between a battery module and an electrical device disclosed by this specification is a connection structure between a battery module and an electrical device, the connection structure being for connecting a battery module in which a plurality of electric cells are arranged in a line and are connected to each other, and an electric device arranged on a side of the battery module, the connection structure comprising: a connecting portion provided in the electrical device; a connection electrode provided in the battery module; and a connection bus bar having one end and another end, the one end being connected to the connecting portion of the electrical device, and a welding plate to be welded to the connection electrode in the battery module being provided at the other end.

The welding plate is provided with a deformation-allowing portion for keeping a welding face of the welding plate and the connection electrode of the battery module in a state of contact, the deformation-allowing portion being able to elastically deform.

When the welding face of the welding plate is brought into contact with the connection electrode, even if there is a shift therebetween, the welding face and the connection electrode are kept in a state of contact due to the deformation-allowing portion elastically deforming. As a result, the welding plate provided on the connection bus bar can be firmly welded and connected to the connection electrode in the counterpart battery module.

The following configurations may also be employed.

The deformation-allowing portion is a groove-shaped recessed portion having a bent shape formed in an entire region, in a width direction, of the welding plate.

Unlike the case where an opening is formed in the welding plate or the welding plate is thinned in order to allow elastic deformation, the cross-sectional area thereof is unchanged. Accordingly, resistance when electricity is passes therethrough is suppressed to a low level, and good conductivity is achieved.

The welding plate is formed as a body separate from the connection bus bar, the welding plate being made of a thin plate material that is thinner than the connection bus bar.

The deformation-allowing portion provided in the welding plate can be readily processed.

The welding plate can be accommodated in a holding member that has an insulating property and is installed on an upper face of the connection electrode in the battery module, and a restricting portion for restricting restoring deformation of the welding plate based on a restoring elastic force of the deformation-allowing portion is provided between the welding plate and the holding member.

If, after welding, the welding plate is prompted to undergo restoring deformation that may cause the welding face to be peeled off, due to the restoring elastic force of the deformation-allowing portion, the restoring deformation is restricted by the restricting portion. As a result, a firm welded state is maintained.

The welding plate is formed into an L-shape provided so that the welding face protrudes forward at a leading end of a vertical face that extends in an up-down direction at a right angle from a leading end of the connection bus bar, and the deformation-allowing portion is provided in the vertical face.

This configuration can be effectively applied to a case where the height positions of the connection electrode in the battery module and the connecting portion of the electrical device differ.

The technique disclosed by this specification enables the welding plate provided on the connection bus bar to be firmly welded to the connection electrode in the counterpart battery module.

DESCRIPTION OF EMBODIMENTS

Figure 8:
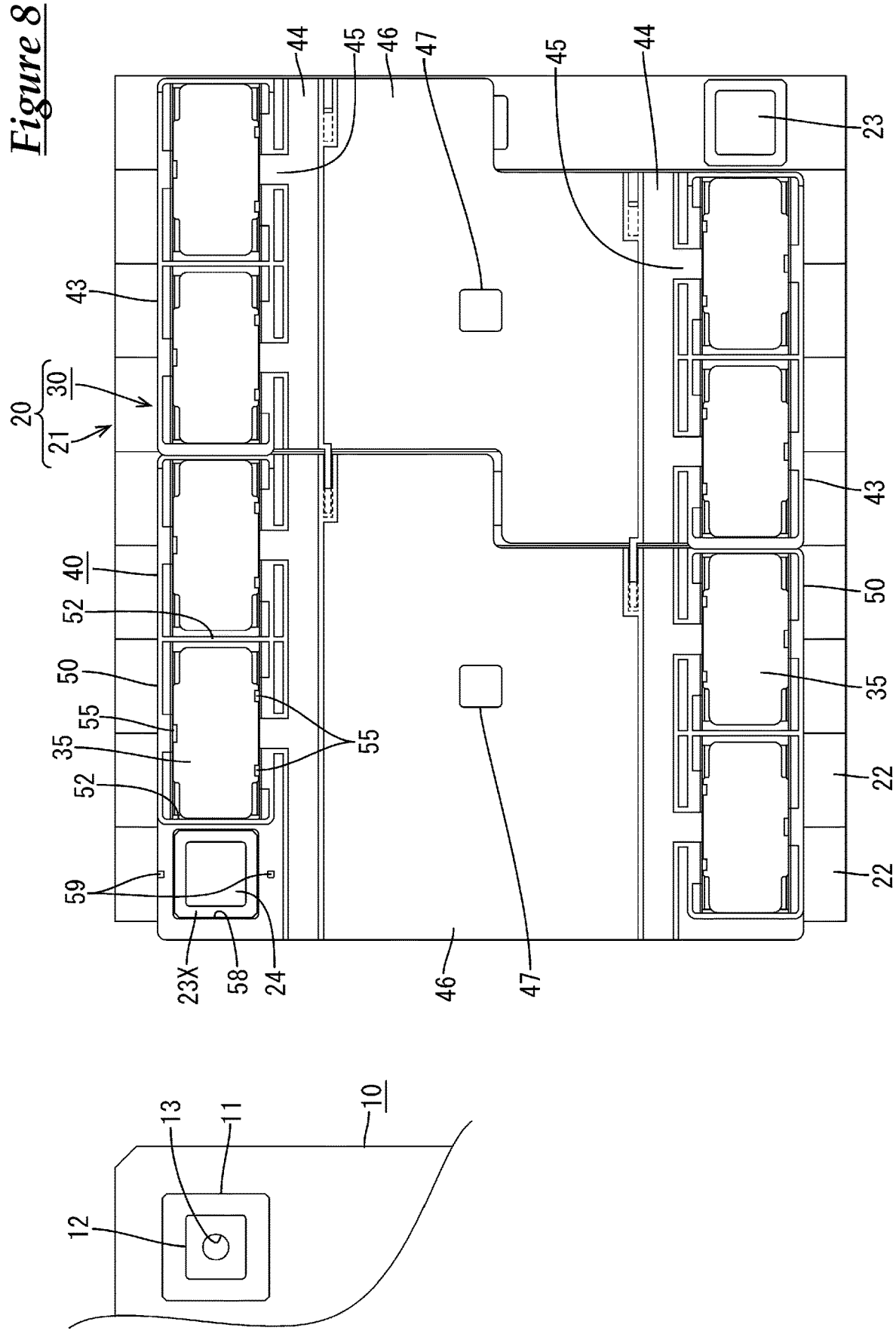
FIG. 8 is a plan view showing a state before the battery module and an electrical device are connected to each other.
Figure 9:
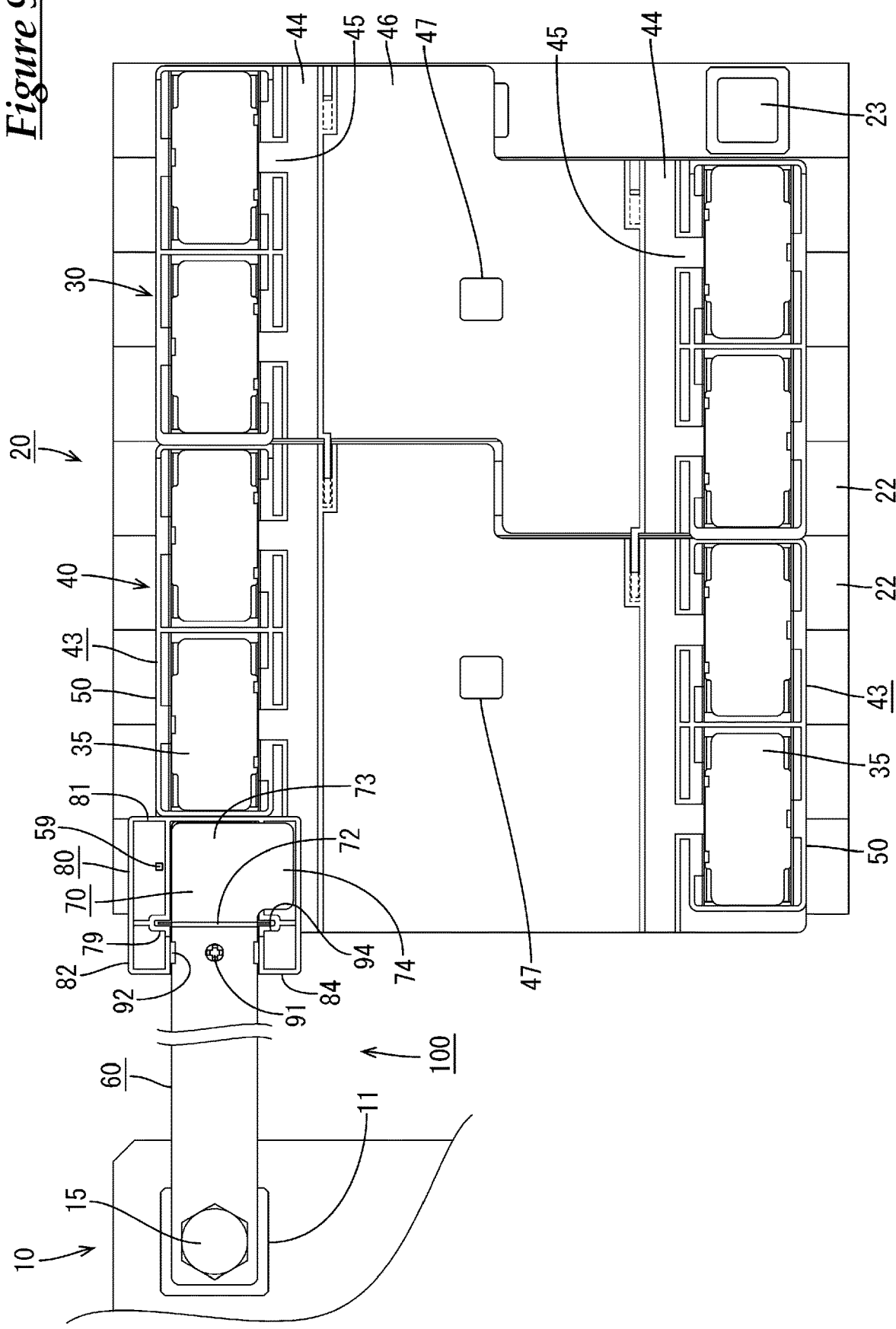
FIG. 9 is a plan view showing a state after connection.

An embodiment will be described with reference to FIGS. 1 to 12. As shown in FIGS. 8 and 9, this embodiment describes an example of a case where the present design is applied to a portion that electrically connects a battery module 20, which is mounted in a vehicle (not shown) such as an electric vehicle or a hybrid vehicle and is used as a power source for driving the vehicle, and an electrical device 10 such as an inverter that is arranged on a side of the battery module 20.

Figure 1:
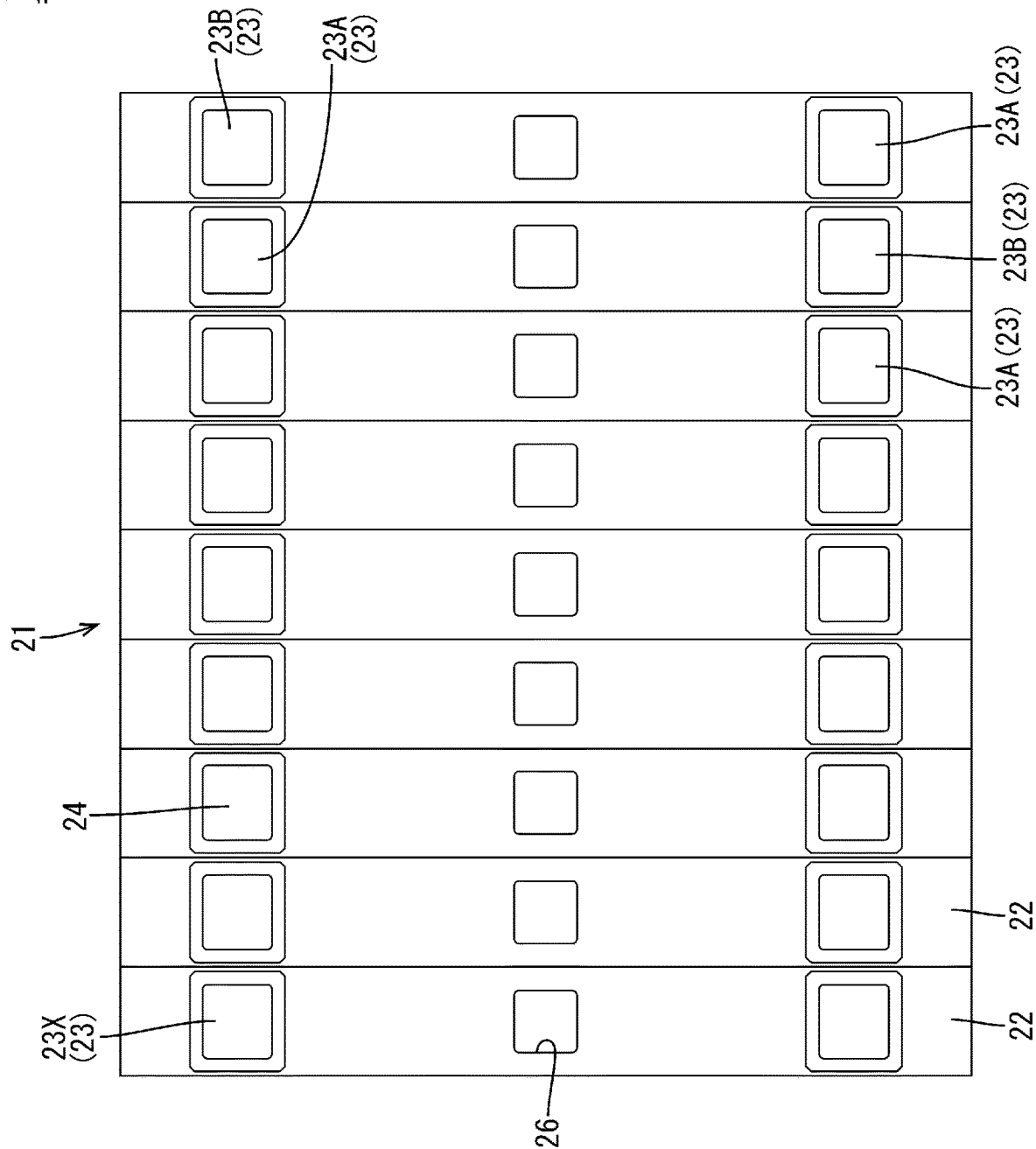
FIG. 1 is a plan view of an electric cell group according to an embodiment.

The battery module 20 is configured by attaching a wiring module 30 to an upper face of an electric cell group 21, as shown in FIG. 8, which is configured by arranging a plurality of (nine, in the example shown in the diagram) electric cells 22, as shown in FIG. 1.

Figure 10:
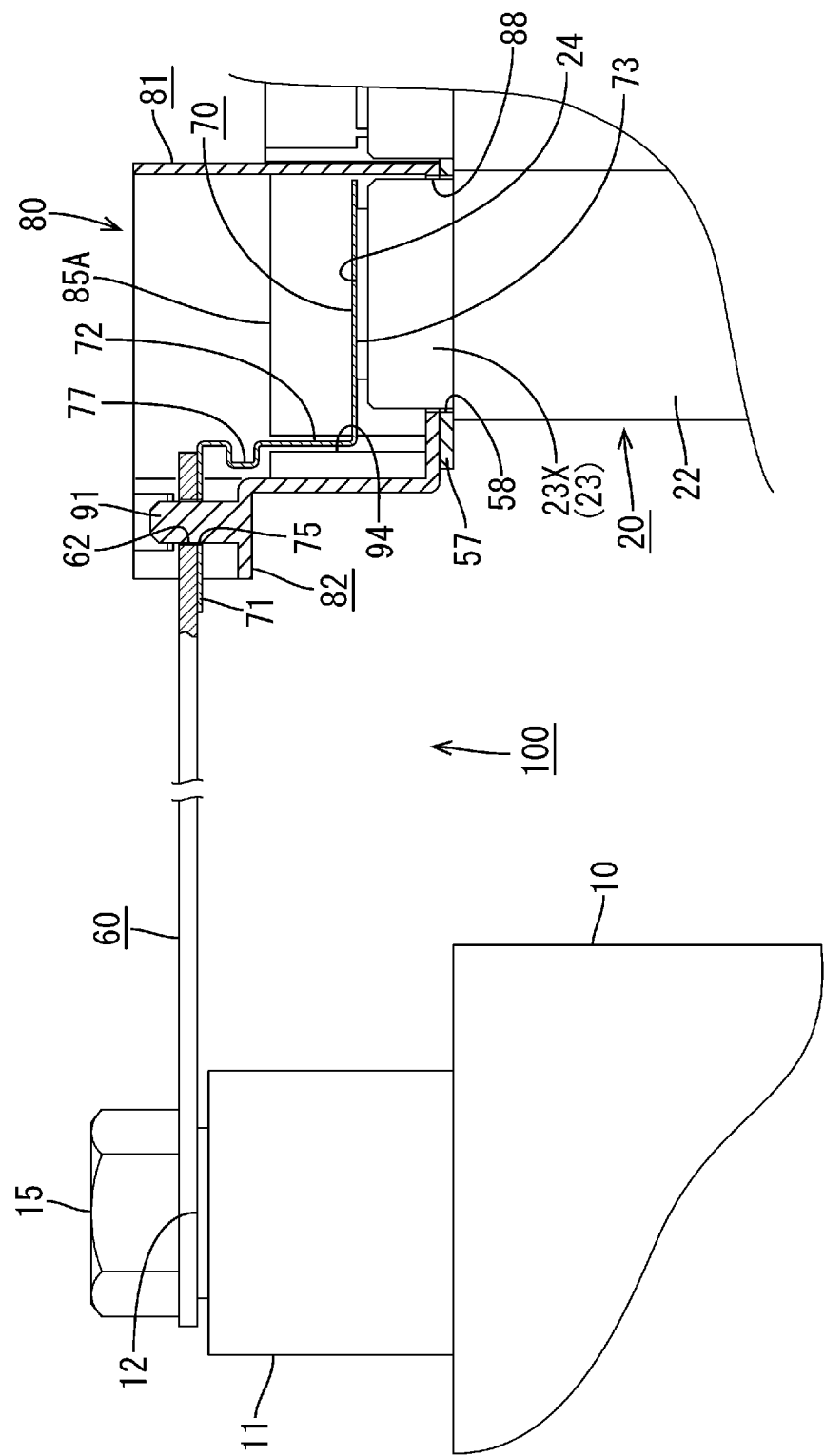
FIG. 10 is a partial cut-out front elevational view showing a connection structure.

As shown in FIG. 1, each electric cell 22 that constitutes the electric cell group 21 has a flat, rectangular parallelepiped shape, and a pair of electrode terminals 23 are arranged on each electric cell 22 at positions close to respective ends in the length direction. One of the electrode terminals 23 is a positive terminal 23A, and the other one is a negative terminal 23B. Each electrode terminal 23 is made of metal, and protrudes to form a rectangular-cylindrical shape, as shown in FIG. 10. A contact face 24 is formed in a raised manner at a central portion of an upper face of each electrode terminal 23.

As shown in FIG. 1, the electric cells 22 are arranged so that two adjoining electric cells 22 are arranged with electrode terminals 23 having different polarities located next to each other, i.e. the positive terminal 23A of one electric cell 22 is located next to the negative terminal 23B of another electric cell 22 that is adjacent to the one electric cell 22.

A positioning recessed portion 26 having a rectangular shape, to which a positioning protruding portion 47 of a later-described insulating protector 40 is fitted, is provided between the pair of electrode terminals 23 on the upper face of each electric cell 22.

Here, one (upper one in FIG. 1) of the electrode terminals 23 of an electric cell 22 that is arranged at an end portion in the electric cell group 21 serves as a connection electrode 23X that is to be connected to the electrical device 10.

The wiring module 30 includes the insulating protector 40 (see FIG. 2), which is made of a synthetic resin, an inter-electrode connection bus bar 35 (hereinafter, simply "bus bar 35"), which is held by the insulating protector 40 and connects the positive terminal 23A and the negative terminal 23B of adjoining electric cells 22, a voltage detection terminal (not shown), which is arranged overlapping the bus bar 35 to be electrically connected thereto, and so on.

Figure 3:
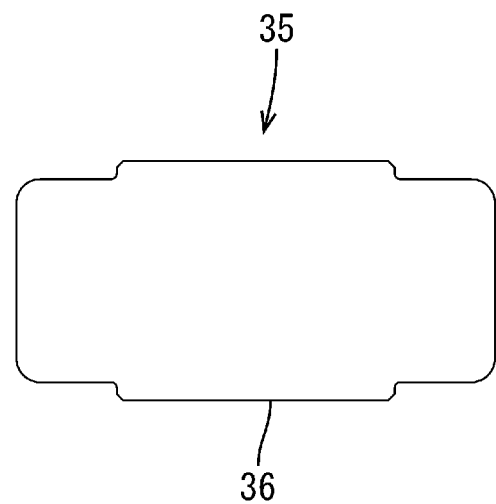
FIG. 3 is a plan view of a bus bar.

The bus bar 35 is formed by pressing a metallic plate, and forms a substantially rectangular shape when seen in a plan view, as shown in FIG. 3. A large-width portion 36 is formed in a central portion of the bus bar 35 in the length direction, and the voltage detection terminal overlaps and is fixed to this large-width portion 36.

Figure 2:
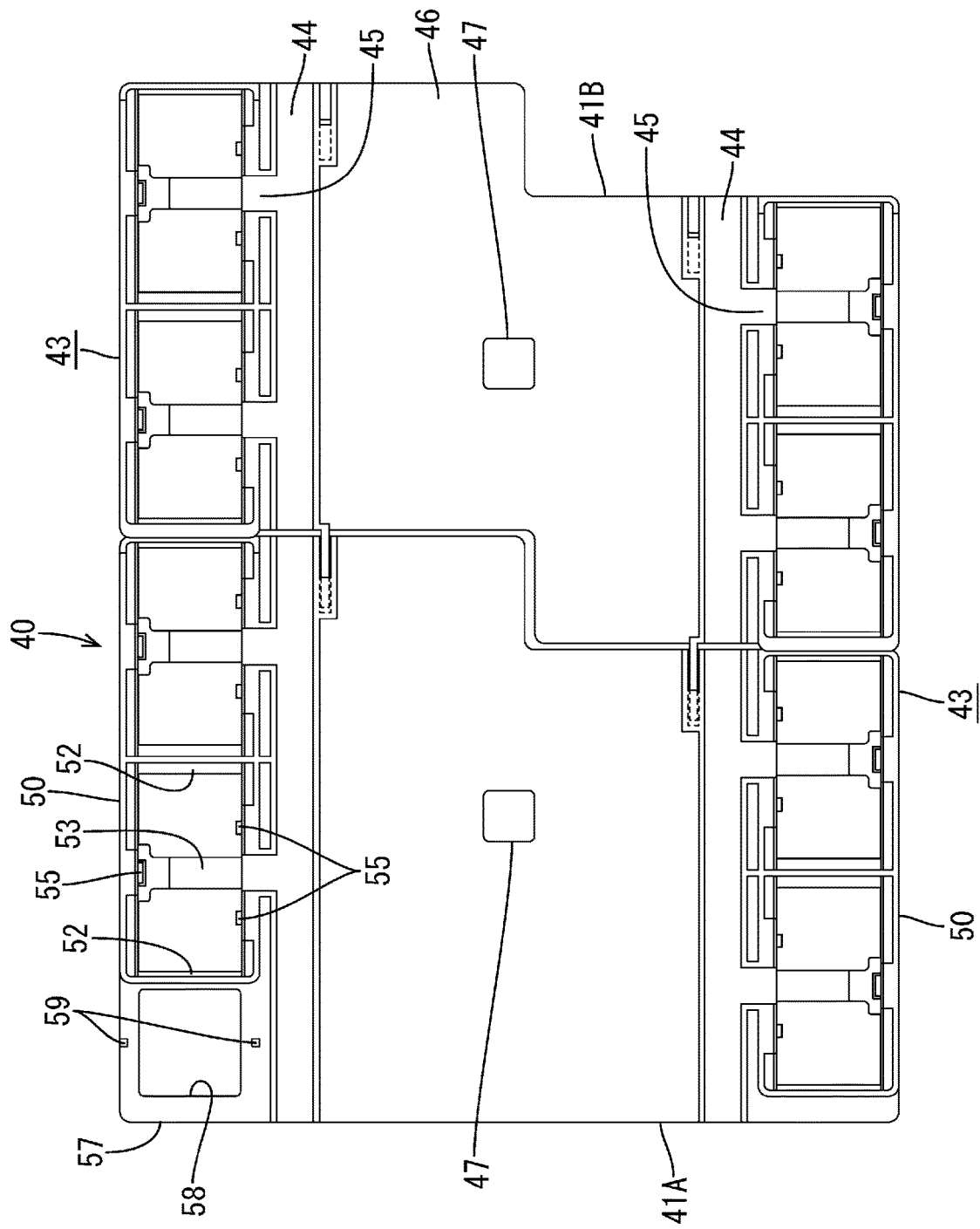
FIG. 2 is a plan view of a resin protector.

As shown in FIG. 2, the insulating protector 40 is configured by joining two unit protectors 41A and 41B to each other.

In an overall structure of the insulating protector 40, a pair of bus bar holding portions 43 are formed along both side edges in the width direction (upper and lower side edges in the diagram), and a pair of wire accommodating grooves 44 are formed inward of the respective bus bar holding portions 43 (central side in the width direction). A structure is employed in which the bus bar holding portions 43 include four rectangular-cylindrical accommodating walls 50, which can accommodate a bus bar 35 and two adjoining electrode terminals 23 from above and below, and are arranged in the length direction. Each pair of bus bar holding portions 43 are arranged shifted in the length direction by the size of one electrode terminal 23.

A substrate 46, which has a flat plate shape, is formed between the pair of wire accommodating grooves 44 so as to join lower faces of the wire accommodating grooves 44. Two positioning protruding portions 47, each having a rectangular shape that fits to a corresponding positioning recessed portion 26, are formed in the substrate 46 in a downward protruding manner at positions that correspond to the respective positioning recessed portions 26 of the electric cells 22, in a state where the insulating protector 40 has been attached to the electric cell group 21.

In each accommodating wall 50 that constitutes a bus bar holding portion 43, receiving portions 52 for receiving end edges of the bus bar 35 on the short sides are formed in opposing faces of both short walls, and a partition wall 53 is formed at the same height as the receiving portions 52 so as to span central portions of both long walls in the length direction. Elastic retaining pieces 55, which are elastically locked to end edges of the bus bar 35 on the long sides to retain the bus bar 35, are formed on opposing faces of both long walls. Note that a wire leading groove 45 for leading a detection wire (not shown) that is connected to the voltage detection terminal toward the wire accommodating groove 44 side is formed in a central portion, in the length direction, of the long wall that is adjacent to the wire accommodating groove 44.

The bus bar 35 is pushed in from above with the elastic retaining pieces 55 elastically deforming, while being guided by the corresponding accommodating wall 50. Upon the bus bar 35 having been pushed in until it abuts against the receiving portions 52 and the partition wall 53, the bus bar 35 is held so as not to come out upward due to elastic restoration of the elastic retaining pieces 55 (see FIG. 8). A back face of the bus bar 35 in areas between the respective receiving portions 52 and the partition wall 53 is exposed downward.

At an upper left corner portion of the insulating protector 40 (left unit protector 41A) in FIG. 2, a placement portion 57, on which a holding member 80 of an inter-component connection bus bar 60 (hereinafter, "connection bus bar 60), details of which will be described later, is placed, is formed flush with the substrate 46. An electrode insertion hole 58, into which the connection electrode 23X of the aforementioned electric cell 22 at the end portion is inserted from below substantially tightly, is formed in the placement portion 57. A pair of positioning pins 59 are arranged standing upright on both upper and lower sides of the electrode insertion hole 58 in the diagram.

The battery module 20 is assembled as follows, for example. First, the wiring module 30 is assembled. The bus bars 35 are accommodated and held by the bus bar holding portions 43 (accommodating walls 50) in the insulating protector 40. The voltage detection terminals (not shown) provided at terminals of the detection wires are fixed, by means of welding or the like, to upper faces of the respective bus bars 35, and the detection wires that have been pulled out are distributed from the wire leading grooves 45 along the wire accommodating grooves 44.

The thus-assembled wiring module 30 is attached to the upper face of the electric cell group 21, with the positioning protruding portions 47 fitted to the positioning recessed portions 26. As a result, the electrode terminals 23 of the electric cells 22 enter the inside of the accommodating walls 50 from below and come into contact with the lower faces of the bus bars 35. Then, the bus bars 35 and the electrode terminals 23 are welded to each other by means of laser welding in which the bus bars 35 are irradiated with a laser.

As a result of attaching the wiring module 30, the connection electrode 23X of a predetermined electric cell 22 passes through the electrode insertion hole 58 in the placement portion 57 of the insulating protector 40, and protrudes upward of the electrode insertion hole 58.

Assembly of the battery module 20 is thus completed, and this battery module 20 is installed at a predetermined position within the vehicle.

An electrical device 10 is arranged at a predetermined position on a side of the battery module 20, as shown in FIG. 8. A connecting portion 11 is arranged standing upright at a corner of an upper face of the electrical device 10. The connecting portion 11 of the electrical device 10 and the connection electrode 23X that is arranged standing upright on the predetermined electric cell 22 in the battery module 20 are electrically connected by the connection bus bar 60.

The connecting portion 11 of the electrical device 10 is made of metal. As shown in FIGS. 8 and 10, the connecting portion 11 is provided protruding in a rectangular-cylindrical shape and is one size larger than the electrode terminal 23 of the aforementioned electric cell 22. A fastening face 12 is formed in a central portion of the upper face of the connecting portion 11 at a position higher than the upper face. A bolt hole 13 is formed in the fastening face 12.

The connecting portion 11 of the electrical device 10 is located on an extension line in the direction in which the electrode terminals 23 are arranged on one side (upper side in FIG. 1) of the electric cell group 21. As shown in FIG. 10, the fastening face 12 of the connecting portion 11 is set so as to be located at a position higher than the contact face 24 of the connection electrode 23X of the aforementioned electric cell 22 by a predetermined height.

Figure 4:
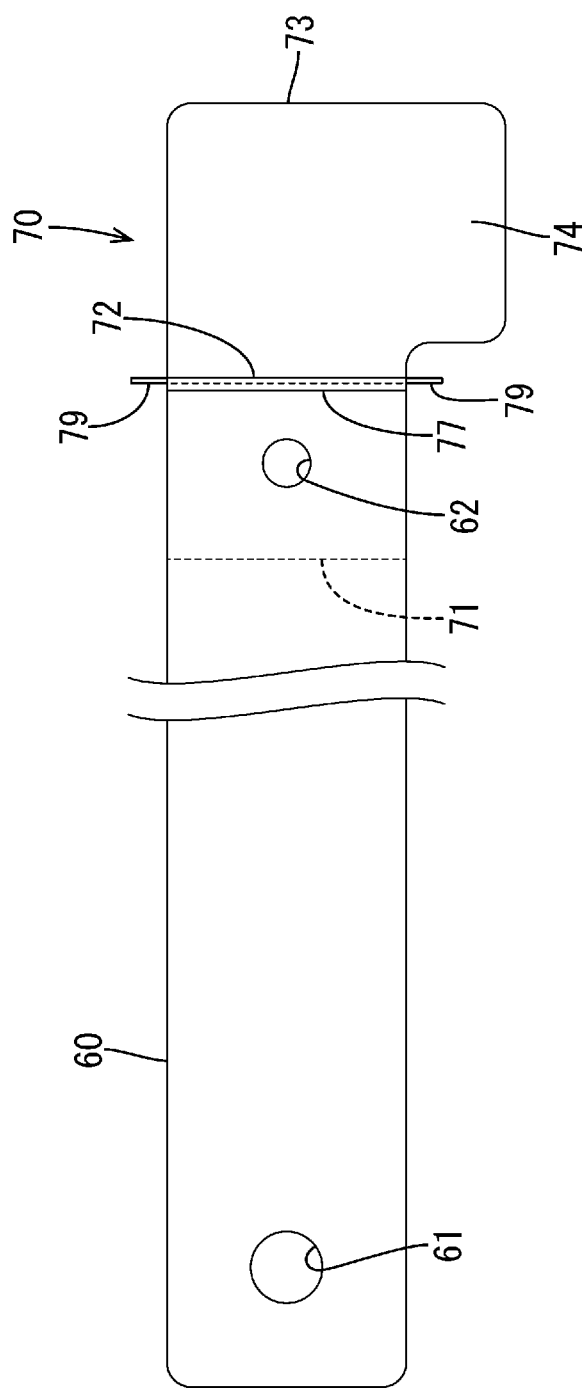
FIG. 4 is a plan view of a connection bus bar.
Figure 5:
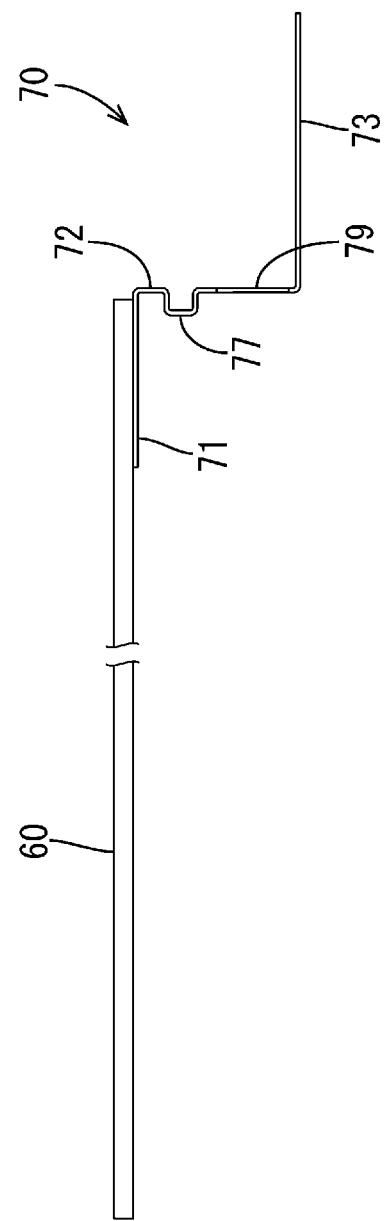
FIG. 5 is a front elevational view of the connection bus bar.

The connection bus bar 60 is formed by pressing a metal plate, and is formed into a band shape having a predetermined length slightly shorter than the distance by which the battery module 20 and the electrical device 10 are separate from each other, as shown in FIGS. 4 and 5. It is preferable to use aluminum or an aluminum alloy as the material, for the purpose of, for example, reducing weight.

A base end portion of the connection bus bar 60 is to be fastened to the connecting portion 11 of the electrical device 10, and a bolt insertion hole 61, into which a bolt 15 is to be inserted, is open at the base end portion of the connection bus bar 60. A positioning hole 62 (see FIG. 10), which is a round hole, is open at a leading end portion of the connection bus bar 60.

A welding plate 70, which is to be connected to the connection electrode 23X of the aforementioned electric cell 22 by means of welding, is provided at the leading end portion of the connection bus bar 60. The welding plate 70 is formed by pressing a metal plate, which is thinner than the connection bus bar 60, into a predetermined shape. It is preferable to use copper or a copper alloy as the material thereof, giving consideration to conductivity or the like.

Specifically, the welding plate 70 has an attachment face 71, which is to be brought into contact with a back face of the leading end portion of the connection bus bar 60, a vertically downward face 72, which is formed by bending a leading end edge of the attachment face 71 downward at a right angle, and a welding face 73, which is formed by bending a lower edge of the vertically downward face 72 forward at a right angle, and the welding plate 70 is formed into a crank shape (or an L-shape if the attachment face 71 is removed), as shown in FIG. 5. As shown in FIG. 4, the attachment face 71 and the vertically downward face 72 of the welding plate 70 have the same width as the connection bus bar 60, and the welding face 73 protrudes at an edge on one side (lower edge in FIG. 4) and has an increased width. The protruding portion of the welding face 73 is used as a pressing portion 74 that is to be pressed by a jig. A positioning hole 75 (see FIG. 10), which is aligned with the positioning hole 62 in the connection bus bar 60, is formed in the attachment face 71.

As mentioned above, the welding plate 70 is formed into substantially an L-shape, considering that there is a size difference in the height direction between the fastening face 12 of the connecting portion 11 of the electrical device 10 and the contact face 24 of the connection electrode 23X of the electric cell 22. For this reason, the height of the vertically downward face 72 is set corresponding to this size difference in the height direction.

The attachment face 71 of the welding plate 70 is brought into contact with the back face of the leading end portion of the connecting bus bar 60, with the positioning holes 75 and 62 aligned with each other, and is firmly attached thereto by means of ultrasonic welding (see FIG. 5). Accordingly, although the details will be described later, settings have been made so that, when the base end portion of the connection bus bar 60 is placed on the fastening face 12 of the connecting portion 11 of the electrical device 10, the welding face 73 of the welding plate 70 comes into contact with the contact face 24 of the connection electrode 23X of the electric cell 22, as shown in FIG. 10.

In the aforementioned vertically downward face 72 of the welding plate 70, a groove-shaped recessed portion 77, which extends in a transverse direction relative to the vertically downward face 72 and is bent and recessed toward the back face side thereof, is formed spanning the entire width at a position close to an upper edge of a front face of the vertically downward face 72. This groove-shaped recessed portion 77 corresponds to "deformation-allowing portion".

Also, a pair of restricting pieces 79 are formed at left and right vertical edges of the vertically downward face 72 of the welding plate 70 so as to protrude at positions lower than the aforementioned groove-shaped recessed portion 77.

Figure 6:
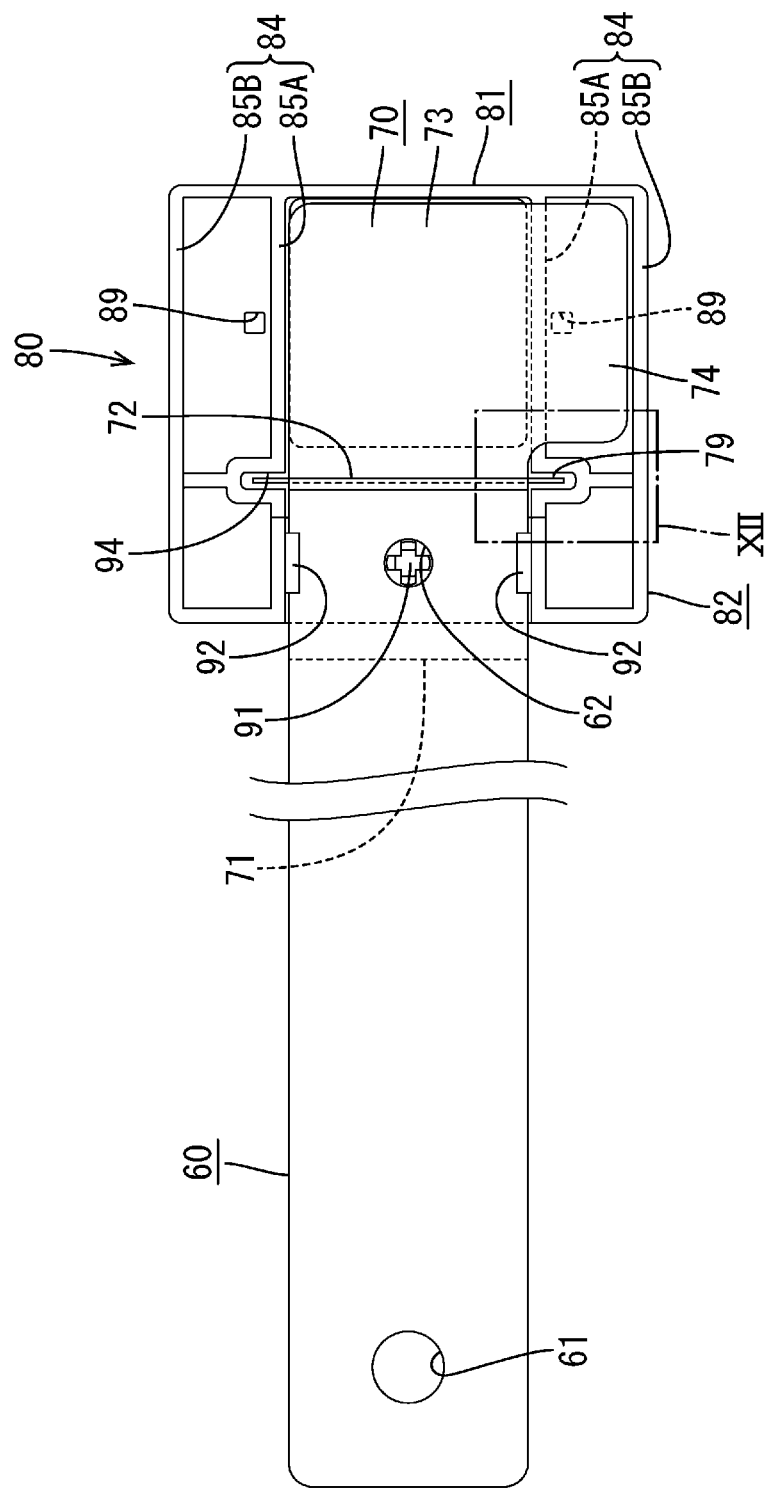
FIG. 6 is a plan view of the connection bus bar in a state of having been attached to a holding member.
Figure 7:
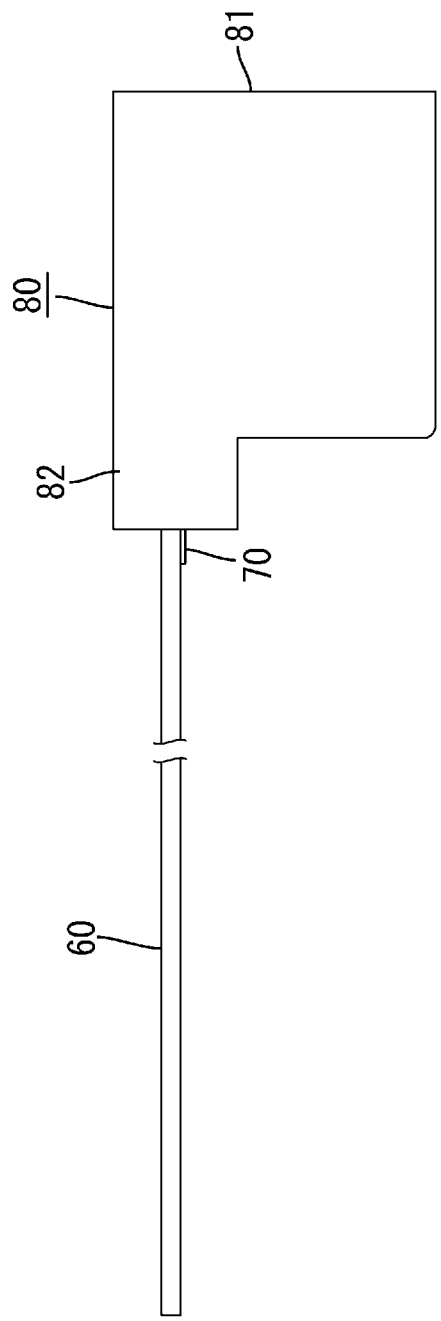
FIG. 7 is a front elevational view of the connection bus bar in a state of having been attached to the holding member.

Meanwhile, a holding member 80 is provided, which can accommodate and hold the leading end portion, including the welding plate 70, of the connection bus bar 60. The holding member 80 is made of a synthetic resin, and is formed into a box shape that is to be placed on the aforementioned placement portion 57 of the insulating protector 40 and is open substantially in its upper face, as shown in FIGS. 6 and 10. More specifically, the holding member 80 is formed so that an upper portion of its face on the side opposing the electrical device 10 protrudes (protruding portion 82), as shown in FIG. 10. Also, left and right side walls of the holding member 80 are each constituted by a double wall portion 84, which includes an inner wall 85A and an outer wall 85B, as shown in FIG. 6. The gap between the opposing inner walls 85A of the left and right double wall portions 84 is the same as the width of the connection bus bar 60.

An electrode insertion hole 88, into which the connection electrode 23X of the electric cell 22 can be inserted, is open in a bottom face of a body box portion 81 of the holding member 80. A positioning hole 89, into which a positioning pin 59 that is arranged standing upright on the placement portion 57 of the insulating protector 40 is fitted, is formed in a bottom face of each double wall portion 84 of the body box portion 81. An upper edge of the inner wall 85A of one (upper one in FIG. 6) of the double wall portions 84 of the body box portion 81 stays at a position slightly lower than the bottom face of the protruding portion 82, as shown in FIG. 10. An upper edge of the inner wall 85A of the other one (lower one in FIG. 6) of the double wall portions 84 is arranged further downward in order to avoid interference with the welding face 73 of the welding plate 70.

A positioning pin 91 is arranged standing upright in the bottom face of the protruding portion 82, the positioning pin 91 being inserted into the positioning hole 62 that is open in the leading end portion of the connection bus bar 60 and the positioning hole 75 that is open in the attachment face 71 of the welding plate 70, as shown in FIG. 10. Also, elastic retaining pieces 92, which are elastically locked to both side edges of the leading end portion of the connection bus bar 60 to prevent the connection bus bar 60 from coming out upward, are provided in the opposing faces of the inner walls 85A of the protruding portion 82, as shown in FIG. 6.

Also, restricting pieces 94, into which the aforementioned restricting pieces 79 that are formed to protrude at both side edges of the vertically downward face 72 of the welding plate 70 can be inserted, are provided at positions close to the protruding portion 82, in the respective inner walls 85A of the double wall portions 84 of the body box portion 81.

Subsequently, an example of a procedure for connecting the battery module 20 and the electrical device 10 to each other will be described.

First, the holding member 80 for the connection bus bar 60 is installed onto the placement portion 57 of the insulating protector 40 that constitutes the wiring module 30. The holding member 80 is pressed until it comes into contact with the placement portion 57, while the positioning holes 89 in the bottom face are aligned with the positioning pins 59. Upon the holding member 80 being properly placed onto the placement portion 57, the connection electrode 23X protrudes past the bottom portion of the body box portion 81, through the electrode insertion hole 88, as shown in FIG. 10.

Next, the connection bus bar 60 is arranged to span the battery module 20 and the electrical device 10. First, the leading end portion of the connection bus bar 60 is inserted, together with the welding plate 70, into the holding member 80 from above. Specifically, the leading end portion of the connection bus bar 60 and the attachment face 71 of the welding plate 70 provided on the back face of the leading end portion of the connecting bus bar 60 are accommodated so as to be sandwiched by the opposing inner walls 85A of the protruding portion 82 as shown in FIG. 6, while being positioned by fitting the positioning pin 91 into the positioning holes 62 and 75. As for the welding plate 70, the welding face 73 is accommodated so as to be sandwiched by the inner wall 85A of one of the double wall portions 84 and the outer wall 85B of the other one of the double wall portions 84, while the restricting pieces 79 that are formed to protrude at both side edges of the vertically downward face 72 are guided downward along the restricting grooves 94 formed in the opposing inner walls 85A of the body box portion 81. The accommodating operation is completed when the welding face 73 comes into contact with the contact face 24 of the connection electrode 23X, as shown in FIG. 10. At this time, as shown in FIG. 6, the elastic retaining pieces 92 that are provided in the double wall portions 84 of the protruding portion 82 are locked to both side edges of the leading end portion of the connection bus bar 60, and thus, the connection bus bar 60 is prevented from coming out upward.

Upon accommodation of the leading end side of the connection bus bar 60 being completed as described above, the base end portion of the connection bus bar 60 is placed onto the fastening face 12 of the connecting portion 11 of the electrical device 10, with the bolt insertion hole 61 being aligned with the bolt hole 13.

In this state, the bolt 15 is passed through the bolt insertion hole 61 in the base end portion of the connection bus bar 60, and is screwed into the bolt hole 13 in the fastening face 12 of the connecting portion 11. Thus, the base end portion of the connection bus bar 60 is fixed with its base end portion pressed against the fastening face 12, as shown in FIGS. 9 and 10.

On the other hand, on the welding plate 70 side of the leading end portion of the connection bus bar 60 in which the welding plate 70 is provided, the pressing portion 74 that is formed protruding from the welding face 73 is held using a jig, and the welding face 73 is brought into close contact with the contact face 24 of the connection electrode 23X. In this state, the welding face 73 is irradiated with a laser using a laser irradiation device (not shown), and thus, the welding face 73 and the contact face 24 are welded to each other by means of laser welding. Moreover, the welding plate 73 that is provided at the leading end of the connection bus bar 60 and the connection electrode 23X are fixed to each other by means of welding.

In this manner, the connection structure 100 is constructed in which the connection electrode 23X of the battery module 20 and the connecting portion 11 of the electrical device 10 are electrically connected to each other using the connection bus bar 60.

This embodiment employs a configuration in which, when the leading end portion of the connection bus bar 60 is fixed to the connection electrode 23X in the battery module 20 by means of welding, the welding plate 70, which is formed as a separate body having a crank shape, is later attached to the leading end portion of the connection bus bar 60 by means of ultrasonic welding. For this reason, there is a concern that the size of the gap between the connection bus bar 60 and the welding face 73 of the welding plate 70 will vary, or the welding face 70 will be fixed in an inclined posture.

In this case, when the welding face 73 of the welding plate 70 opposes the contact face 24 of the connection electrode 23X to undergo laser welding at the time of fixing the base end portion of the connection bus bar 60 to the connecting portion 11 of the electrical device 10 by means of fastening using the bolt 15, for example, there is a concern that a gap will be formed between the welding face 73 of the welding plate 70 and the contact face 24 of the connection electrode 23X. However, in such a case, when the pressing portion 74 is pressed using a jig, the welding face 73 accurately comes into close contact with the entire contact face 24 of the connection electrode 23X, while the groove-shaped recessed portion 77 in the vertically downward face 72 elastically deforms to expand its width, i.e. the vertically downward face 72 deforms to extend in the vertical direction (linear arrow A direction in FIG. 11).

Furthermore, even in a case where the welding face 73 assumes an inclined posture in which the welding face 73 faces obliquely upward on its leading end side, and a gap is formed between the welding face 73 and the connection electrode 23X, when the pressing portion 74 is pressed using a jig, the welding face 73 assumes a horizontal posture, and the welding face 73 similarly accurately comes into close contact with the entire contact face 24 of the connection electrode 23X, while the vertically downward face 72 extends in the linear arrow A direction with the groove-shaped recessed portion 77 of the vertically downward face 72 elastically deforming to expand its width, and the welding face 73 is displaced in the horizontal direction (linear arrow B direction).

In contrast, when the welding face 73 of the welding plate 70 opposes the contact face 24 of the connection electrode 23X to undergo laser welding, conversely, there is a concern that a negative gap will be formed between the welding face 73 of the welding plate 70 and the contact face 24 of the connection electrode 23X. However, at this time, the vertically downward face 72 deforms to contract in the vertical direction (linear arrow A direction in FIG. 11) while the groove-shaped recessed portion 77 of the vertically downward face 72 elastically deforms to narrow its groove width, and the welding face 73 accurately comes into close contact with the entire contact face 24 of the connection electrode 23X, with no overload applied to the welding face 73.

Furthermore, even in the case where the welding face 73 assumes an inclined posture in which the welding face 73 faces obliquely downward on its leading end side, and a negative gap is formed between the welding face 73 and the connection electrode 23X, the welding face 73 assumes a horizontal posture without being subjected to overload, while the groove-shaped recessed portion 77 of the vertically downward face 72 elastically deforms to narrow its groove width, and the vertically downward face 72 contracts in the linear arrow A direction and the welding face 73 is displaced in the horizontal direction (linear arrow B direction). Thus, similarly, the welding face 73 accurately comes into close contact with the entire contact face 24 of the connection electrode 23X.

Note that a position shift between the welding face 73 of the welding plate 70 and the contact face 24 of the counterpart connection electrode 23X may also occur similarly due to, for example, size tolerance of the welding plate 70 or the like, or arrangement tolerance between the battery module 20 and the electrical device 10. However, in the same manner as above, the position shift is absorbed while the vertically downward face 72 expands or contracts in the linear arrow A direction and the welding face 73 is displaced in the linear arrow B direction due to the elastic deformation of the groove-shaped recessed portion 77. Then, the welding face 73 accurately comes into close contact with the entire contact face 24 of the connection electrode 23X.

As a result, the welding plate 70 provided on the connection bus bar 60 can be firmly welded to the connection electrode 23X in the counterpart battery module 20.

Figure 11:
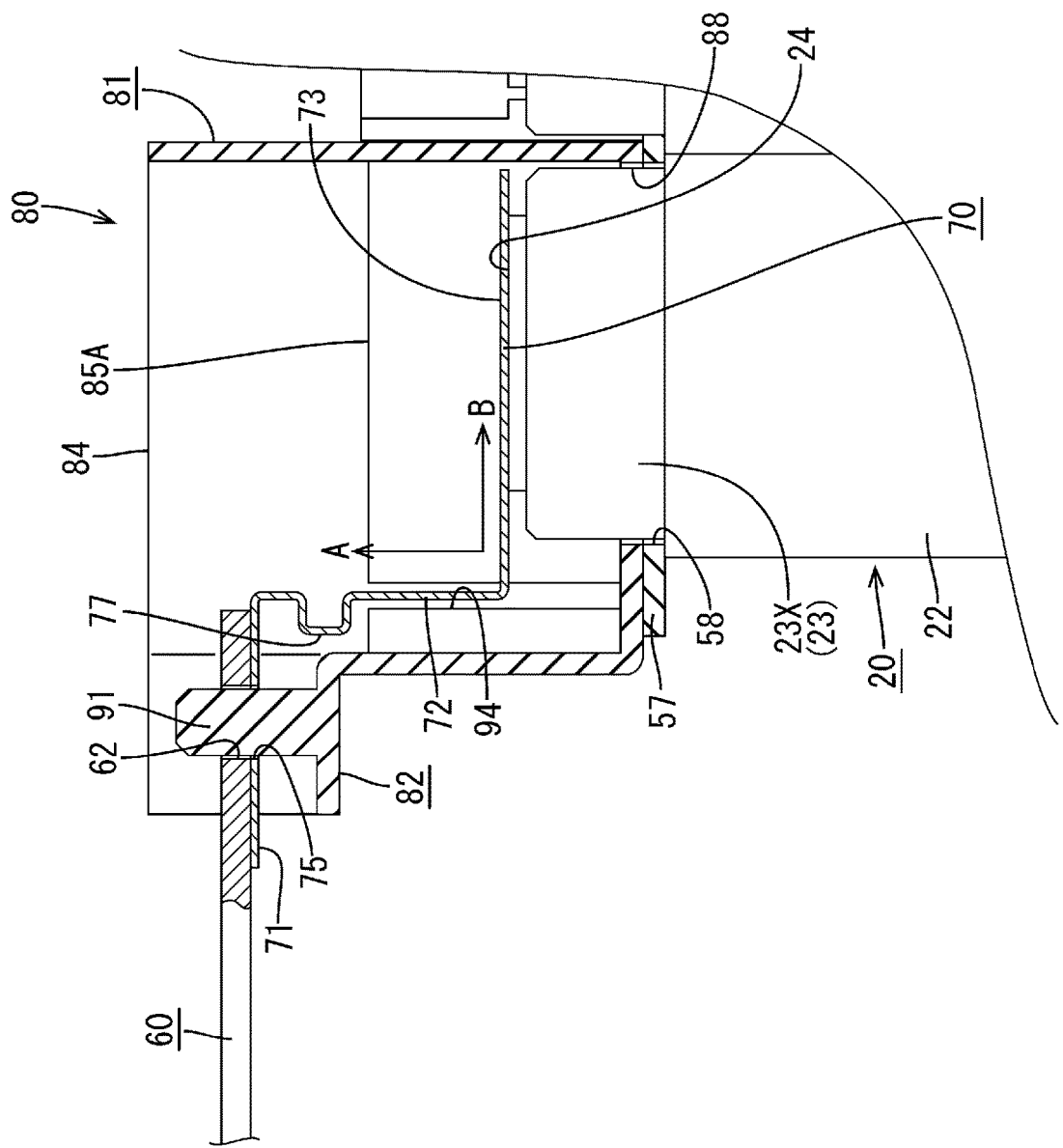
FIG. 11 is a partial enlarged view of FIG. 10.
Figure 12:
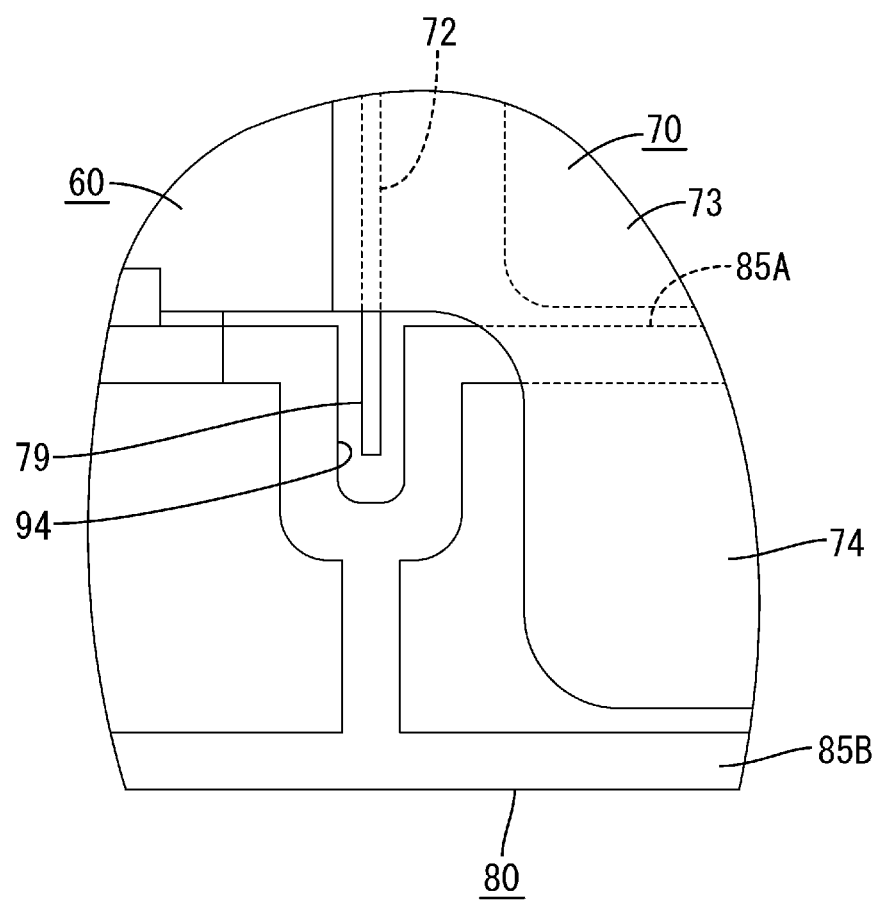
FIG. 12 is an enlarged view of an area XII in FIG. 6.

In the case where laser welding is performed with the welding face 73 of the welding plate 70 being in close contact with the contact face 24 of the connection electrode 23X while the groove-shaped recessed portion 77 is elastically deformed as mentioned above, there is a concern that, for example, the welding face 73 will be displaced in the linear arrow B direction in FIG. 11 and that the welded part will peel apart as a result of the groove-shaped recessed portion 77 deforming to restore its original shape.

In this regard, in this embodiment, the restricting pieces 79 at both side edges of the vertically downward face 72 are fitted to the restricting grooves 94 in the double wall portions 84, thereby restricting displacement of the welding face 73 in the same direction. As a result, the welded part is prevented from being peeled apart.

As described above, according to this embodiment, when the welding face 73 of the welding plate 70 fixed to the leading end portion of the connection bus bar 60 is welded to the contact face 24 of the counterpart connection electrode 23X using a laser, even if there is a shift therebetween before laser welding, this shift is absorbed through elastic deformation of the groove-shaped recessed portion 77 provided in the vertically downward face 72 of the welding plate 70, and the welding face 73 can be accurately brought into close contact with the entire contact face 24 of the connection electrode 23X. As a result, the welding plate 70 provided on the connection bus bar 60 can be firmly welded and connected to the connection electrode 23X in the counterpart battery module 20.

This embodiment employs the groove-shaped recessed portion 77 as the "deformation-allowing portion". With this structure, the cross-sectional area does not change in any portion, unlike the case of forming an opening in the welding plate 70 or thinning the welding plate 70 in order to allow elastic deformation. Accordingly, resistance when electricity is passes through is suppressed to a low level, and good conductivity is achieved.

A means is taken by which the restricting pieces 79 are formed so as to protrude at both side edges of the vertically downward face 72 of the welding plate 70, and these restricting pieces 79 are fitted into the restricting grooves 94 provided in the double walls of the holding member 80, thereby restricting displacement of the welding face 73 of the welding plate 70 in the front-rear direction (linear arrow B direction in FIG. 11).

That is to say, in the case where laser welding is performed with the welding face 73 of the welding plate 70 being in close contact with the contact face 24 of the connection electrode 23X while the groove-shaped recessed portion 77 is elastically deformed, there is a concern that the welding face 73 will be displaced in the front-rear direction and that the welded part will peel apart as a result of the groove-shaped recessed portion 77 deforming to restore its original shape. However, since this embodiment employs the above-described restricting means, displacement of the welding face 73 in the same direction is restricted, and the welded part is prevented from being peeled apart.

Other Embodiments

The technique disclosed by this specification is not limited to the embodiment described with the above description and the drawings, and for example, the following embodiments are also included in the technical scope.

The above embodiment has described an example of the case where the welding plate (excluding the attachment face) forms an L-shape. However, if the contact face of the connection electrode in the battery module is set to have the same height as the fastening face of the connecting portion of the electrical device, the shape of the welding plate may be appropriately changed in accordance with the connection mode, e.g. the welding plate may be formed into a flat plate shape.

As the means of welding the welding plate provided on the connection bus bar to the connection electrode, not only laser welding described as an example in the above embodiment but other welding means, such as ultrasonic welding or soldering (a kind of welding), may also be employed.

The exemplary procedure for connecting the battery module and the electrical device described in the above embodiment is merely an example. For example, this procedure may be modified as appropriate, e.g. the welding plate provided at the leading end of the connection bus bar may be first held by the holding member, and then this holding member may be installed onto the placement portion on the battery module side.

The above embodiment has described an example in which the welding plate is formed as a separate body and is attached later to the connection bus bar. However, the welding plate may also be formed integrally at the leading end portion of the connection bus bar. In this case as well, a shift may occur between the welding face of the welding plate and the contact face of the connection electrode due to the size tolerance of components or arrangement tolerance, and accordingly, the technique disclosed herein is applicable in a similar manner.

The groove-shaped recessed portion, which serves as the deformation-allowing portion, is not limited to have a rectangular cross-section as in this embodiment, and may also have another cross-sectional shape, such as a trapezoid. Furthermore, the groove-shaped recessed portion may also be provided to have a plurality of steps in its height direction.

The means of allowing deformation of the welding plate is not limited to the groove-shaped recessed portion that is described as an example in the above embodiment, and another means, such as forming an opening or thinning the welding plate, may also be employed.

The above embodiment has described an example of the case of welding the welding plate provided at the leading end portion of the connection bus bar to the connection electrode of the electric cell. However, a structure in which this welding plate is welded onto a bus bar that connects adjoining electrode terminals may also be employed. In this case, the bus bar serves as the "connection electrode".

The electrical device arranged on the side of the battery module may also be an electrical device other than an inverter, such as a junction box, or may also be another battery module.

There is a connection mode in which one battery module is connected to a relay bus bar in a unit in which a plurality of battery modules are joined to each other using the relay bus bar. In this mode, the unit corresponds to the "electrical device", and the relay bus bar corresponds to the "connecting portion". In short, conductive members such as the relay bus bar arranged in the electrical device are each regarded as the "connecting portion of the electrical device", and this configuration is also encompassed in the technical scope.

The above embodiment has described, as the restricting portion for restricting restoring deformation of the welding plate, an example of a structure in which the welding face is displaced in a direction parallel to the plate face. However, any other structure may be provided, e.g. a structure in which displacement of the vertically downward face in the up-down direction is restricted is provided between a lower end of the vertically downward face and the holding member may be employed, as long as, in short, restoring deformation of the welding plate is restricted in order to prevent the welding face from being peeled off.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Electrical device
11 Connecting portion
20 Battery module
22 Electric cell
23X Connection electrode
60 Connection bus bar
70 Welding plate
72 Vertically downward face (vertical face)
73 Welding face
77 Groove-shaped recessed portion (deformation-allowing portion)
79 Restricting piece (restricting portion)
80 Holding member
94 Restricting groove (restricting portion)
100 Connection structure between battery module and electrical device

The invention claimed is:

1. A connection structure between a battery module and an electrical device, the connection structure for connecting a battery module in which a plurality of electric cells are arranged in a line and are connected to each other, and an electric device arranged on a side of the battery module, the connection structure comprising:
   a connecting portion provided in the electrical device;
   a connection electrode provided in the battery module; and
   a connection bus bar being formed of a metal plate and having a first end and a second end, the first end being connected to the connecting portion of the electrical device, and the second end being connected to a welding plate that is formed as a body separate from the connection bus bar and that is to be welded to the connection electrode in the battery module, the separate welding plate being made of a thinner material than that of the connection bus bar,
wherein the welding plate is provided with a groove-shaped recessed portion that is configured to elastically deform so as to keep a welding face of the welding plate and the connection electrode of the battery module in a state of contact during welding.

2. The connection structure between a battery module and an electrical device according to claim 1,
wherein the groove-shaped recessed portion has a bent shape formed in an entire region, in a width direction, of the welding plate.

3. The connection structure between a battery module and an electrical device according to claim 1,
wherein the welding plate is accommodated in a holding member that has an insulating property and is installed on an upper face of the connection electrode in the battery module, and
a restricting portion for restricting restoring deformation of the welding plate based on a restoring elastic force of the groove-shaped recessed portion is provided between the welding plate and the holding member.

4. The connection structure between a battery module and an electrical device according to claim 1,
wherein the welding plate is formed into an L-shape provided so that the welding face protrudes in a first direction at a leading end of an orthogonal face that extends in a second direction and that is disposed so as to form a right angle with the second end of the connection bus bar, and
the groove-shaped recessed portion is provided in the orthogonal face.

5. A connection structure between a battery module and an electrical device, the connection structure for connecting a battery module in which a plurality of electric cells are arranged in a line and are connected to each other, and an electric device arranged on a side of the battery module, the connection structure comprising:
a connecting portion provided in the electrical device;
a connection electrode provided in the battery module;
a welding plate that has an attachment face, an orthogonal face, and a welding face that is attached to a contact face of the connection electrode, the welding face and the attachment face each extends in a first direction, the orthogonal face extends in a second direction that is orthogonal to the first direction, and the orthogonal face connects the welding face to the attachment face;
a connection bus bar being formed of a metal plate that is separate from the welding plate and having a first end and a second end, the first end being connected to the connecting portion of the electrical device, and the second end being connected to the attachment face of the welding plate; and
a holding member that holds the second end of the connection bus bar and the attachment face of the welding plate and that includes a positioning pin that extends in the second direction, the positioning pin is inserted through a positioning hole within the attachment face of the welding plate and a positioning hole within the connection bus bar,
wherein the separate welding plate is made of a thinner material than that of the connection bus bar, and
the orthogonal face includes a groove-shaped recessed portion that is configured to elastically deform so as to keep the welding face of the welding plate and the connection electrode of the battery module in a state of contact during welding.

* * * * *